June 2, 1959   R. HEIDECKE ET AL   2,889,095
CARRYING STRAP CONNECTING MEANS FOR PHOTOGRAPHIC CAMERAS
Filed Oct. 2, 1956                     2 Sheets-Sheet 1
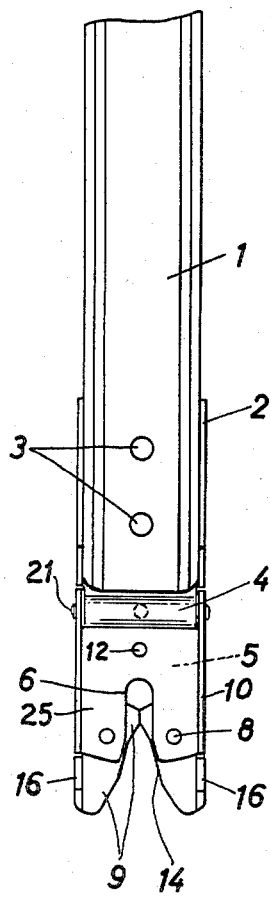
Fig. 1
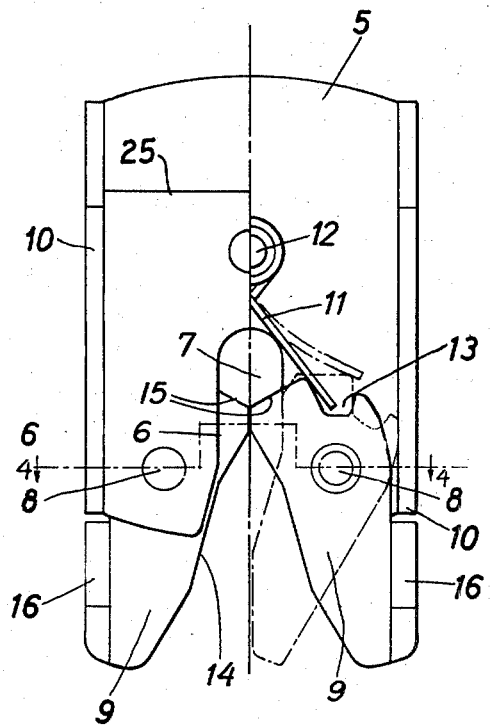
Fig. 5
Fig. 2
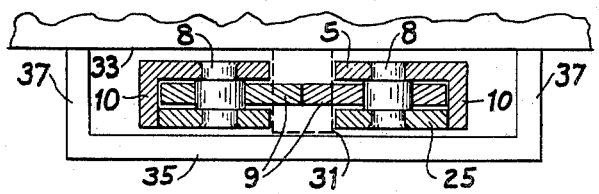
Fig. 4

United States Patent Office 2,889,095
Patented June 2, 1959

2,889,095

CARRYING STRAP CONNECTING MEANS FOR PHOTOGRAPHIC CAMERAS

Reinhold Heidecke and Gerhard Fraderich, Braunschweig, Germany, assignors to Franke & Heidecke, Fabrik Photographischer Prazisions-Apparate, Braunschweig, Germany, a German firm Application October 2, 1956, Serial No. 613,580

Claims priority, application Germany December 16, 1955

7 Claims. (Cl. 224—5)

The present invention relates to means for connecting a carrying strap to a photographic camera.

An object of the invention is the provision of generally improved and more satisfactory connecting means for the above purpose.

Another object is the provision of connecting means so designed and constructed that the carrying strap may be attached to or detached from the camera with the greatest speed, and yet will be secure against accidental detachment.

Still another object is the provision of attaching means capable of withstanding the oblique or angular forces which sometimes occur, as for example when the camera strap is being passed over the head or shoulder of a person, without damage to the parts and without danger of accidental disengagement such as has occurred with certain prior carrying straps used with photographic cameras.

These and other desirable objects may be attained in the manner disclosed as an illustrative embodiment of the invention in the following description and in the accompanying drawings forming a part hereof, in which:

Fig. 1 is a face view of the end portion of the carrying strap and the attaching fixture carried by this end of the strap, removed from the camera;

Fig. 2 is a view of a portion of the attaching fixture itself, without the strap, and with parts of the fixture removed in order to show the interior construction;

Fig. 4 is a view partly in plan and partly in horizontal section, showing the attaching fixture attached to the camera; and Fig. 5 is an edge view of the attaching fixture and the lower end of the carrying strap, in position on the camera, with part of the camera in vertical section.

The same reference numerals throughout the several views indicate the same parts.

Figure 3:
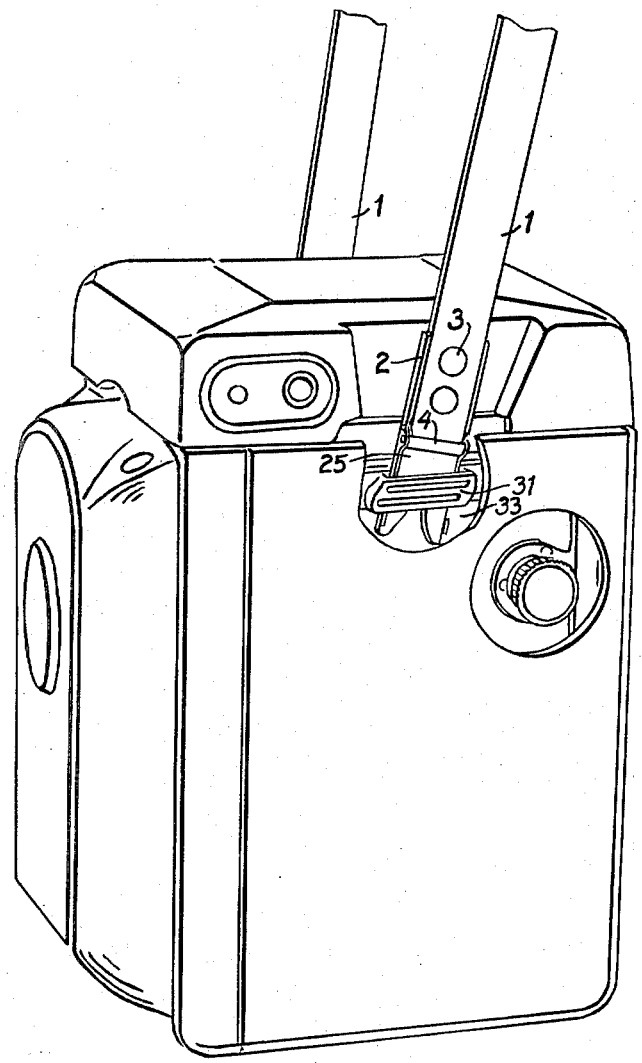
Fig. 3 is a perspective view of a camera in its carrying case, and with the carrying strap arrangement of the present invention attached to the camera in the normal position of use.

The problems involved in attaching a carrying strap to a photographic camera are somewhat different from those involved in attaching structures used in other fields. First, the carrying strap must be capable of being placed on or removed from the camera very rapidly, because the opportunity for a certain picture is often a very fleeting one, and the operator may find it more convenient to remove the strap from the camera for easier handling of the camera when the picture is to be taken. Likewise, after taking the picture, it may be necessary to attach the carrying strap again very rapidly, in order to move on quickly to another location.

Second, the strap must be connected to the camera with great security against accidental disconnection, even though it must be capable of disconnection very rapidly when desired.

Third, the strap must be able to withstand pulls or strains in unusual directions, as might occur when placing the strap carelessly over the head or shoulders of the user, without incurring either damage to the connecting parts or accidental disconnection of the parts.

Fourth, in spite of the severity of the foregoing requirements, the connecting means must be relatively small, compact, and light in weight. With cameras which themselves are quite small and often called miniature cameras, the user is not likely to tolerate strap connecting devices which are bulky or out of proportion to the small size of the camera itself.

The present invention solves these various problems and fulfills the above mentioned requirements in a particularly satisfactory way. Referring to the drawings, the preferred embodiment of the present invention comprises a carrying strap 1 of any desired length, of suitable flexible material such as a strap of leather, each end of the strap having a fitting 2 secured thereto as by means of rivets 3. The fitting 2 is of metal the end of which is formed into a transversely extending hinge barrel 4, lying with its axis approximately in the plane of the lower end of the strap 1 and perpendicular to the length of the strap.

The hinge barrel 4 is connected by a hinge pin 21 passing longitudinally through the barrel to an attaching fixture having a main back plate 5, of channel-shaped cross section having side flanges 10 extending forwardly at the two lateral edges of the main portion or back plate portion 5. The ends of the hinge pin 21 are secured in the side flanges 10. A front plate 25 covers most of the area of the back plate 5, between the side flanges 10, and is held in fixed but spaced relation to the back plate 5 by spacer rivets 8 and 12 having reduced ends which extend through and are riveted in the plates 5 and 25, respectively, the rivets being enlarged between these two plates so as to act as spacers.

Both the front plate 25 and the rear plate 5 are provided with a central slot 6, opening at the lower or free end of the respective plates 5 or 25, and extending longitudinally along the respective plate, approximately on the center line thereof, to a closed end 7 in a position roughly midway of the length of the attaching fixture. The slot 6 in the front plate 25 is of the same size as the slot in the rear plate 5, and the two slots are in complete alinement with each other when viewed from the front or rear of the attaching fixture, so that in effect they form, for practical purposes, a single slot through a hollow body. When the carrying strap is attached to the camera, this slot in the attaching fixture receives the fixed pin 31 projecting laterally from the side wall 33 of the camera, there being such a pin located near the top of each of the two opposite side walls of the camera body, the two pins on the two sides of the camera being axially alined with each other. The attaching fixture at one end of the carrying strap 1 latches onto the pin 31 on one side wall of the camera, and the duplicate attaching fixture at the other end of the same carrying strap latches onto the other duplicate pin 31 on the other side wall of the camera.

To hold the pin in place at the end 7 of the slot 6 of the fixture, two latching dogs are provided on each fixture, either latching dog alone being sufficient to hold the pin so that the two dogs together provide a particularly secure connection. The two latching dogs are reverse duplicates or mirror image duplicates of each other. As seen in Fig. 2, each dog 9 is pivoted on one of the rivets 8, and lies between the front plate 25 and back plate 5 of the fixture, with the length of the dog in a general direction approximately parallel to the center line of the fixture. In the normal or latching position of each dog, there is an abutment portion or latching nose extending from the pivot 8 of the dog in an oblique direction toward the inner or closed end 7 of the slot 6 and terminating in an abutment surface 15 which extends approximately half way across the width of the slot 6 in position to obstruct removal of the camera pin 31 and keep it from sliding out toward the open end of the slot, if this pin is at the upper or closed end 7 of the slot. When in normal latching position, the latching noses of the two dogs are in contact with each other and meet at the center line of the slot 6, as seen in Figs. 1 and 2.

Each dog 9 also has a tail portion or manipulating portion extending from the pivot 8 in approximately the opposite direction from the abutment portion 15, and projecting beyond the lower end or free end of the body part 5, 25 to a position accessible to the fingers of the operator. Lateral flanges 16 bent up from the outer edges of the latching dogs 9 serve as finger grips for more easily manipulating the dogs. It will be readily seen from Figs. 1 and 2 that when the finger pieces of the two dogs are squeezed toward each other, the dogs will be shifted from the full line position shown in Figs. 1 and 2 to the position shown in Fig. 2 in dot-dash lines with respect to one dog (the other dog assuming a similar position) so that the latching nose or abutment end 15 of the dog is displaced laterally out of the area of the slot 6, thereby allowing the camera pin 31 to slide out from the closed end 7 to the free or open end of the slot.

A spring 11 is coiled around the central rivet 12, in the space between the front and back plates 25 and 5, and has its two ends engaged in recesses 13 formed in the respective dogs 9 above the pivots 8, as shown, the spring reacting on the dogs in a manner to tend to keep the dogs in latching position across the slot 6. The tails of the dogs engage or substantially engage the side flanges 10 to limit the extent to which the spring may swing either dog across the slot 6, so that both are held approximately equally in latching position and in contact with each other. It will be noted from the drawings that if the camera pin 31 is at the end 7 of the slot, above the dogs, and is pulled downwardly (or if the carrying strap and fixture are pulled upwardly, which produces the same forces) the downward push of the pin against the dog is in a direction offset from the pivots 8 and tends to swing the dogs toward their latching position rather than toward their unlatching position. Hence the more pull exerted on the attaching fixture, the greater the force holding the dogs in latching position. Therefore, the spring 11 can be made quite light, with the result that the dogs are very easy to unlatch when desired. However, they are quite secure against accidental unlatching, because both dogs must be simultaneously moved to unlatching position in order to allow the camera pin to be withdrawn from the slot. Since the diameter of the camera pin is considerably greater than half the width of the slot, and only very slightly less than the full width of the slot, it follows that either latching dog alone will suffice to hold the pin in place, so that accidental movement of only one dog to an unlatched position will not result in disengagement of the attaching device from the camera.

The device may be attached to the camera pin very quickly, because of the shape of the opposed inner edges of the respective dogs as shown at 14. These portions of the dogs form inclined cams so that if the attaching fixture is simply thrust endwise or longitudinally toward the camera pin 31, the relative movement between the attaching fixture and the camera pin will cause the pin to react with the inclined cam surfaces 14 in a manner to open the latching dogs automatically to let the pin slide along the slot 6 to the end 7, and the dogs will latch automatically behind the pin after the pin passes them.

In order to maintain the attaching fixture on the camera pin against sideways forces in a direction axially of the pin, the side wall 33 of the camera is provided with a stirrup member 35 the main portion of which extends pass the end of the pin 31 parallel to and spaced outwardly from the camera wall 33, the stirrup having end flanges 37 arranged perpendicular to the camera wall, and suitably secured to the wall as by screws or rivets. The space between the portion 35 and the camera wall 33 is only slightly wider than the total thickness of the attaching fixture 5, 10, 25, so that the latter may easily be thrust downwardly into the space between the camera wall 33 and the stirrup member 35, when the carrying strap is to be attached to the camera. Such downward movement will automatically engage the attaching fixture with the pin 31 and latch it thereto, as explained above. In the latched position, the finger pieces 16 on the tails of the latching dogs lie below the bottom of the stirrup member 35, as well seen in Fig. 3, so that these finger pieces may be grasped and squeezed together when the strap is to be removed from the camera.

The length of the space between the stirrup member 35 and the camera wall, that is, the length from one end flange 37 to the other end flange 37 of the stirrup member, is somewhat greater than the width of the attaching fixture, so that the entire attaching fixture may swing through a substantial range backwardly or forwardly in a plane parallel to the side wall 31 of the camera, to accommodate the device to changes in the angle of pull. The end flanges 37 constitute stops limiting the possible extent of such swinging. If the strap is pulled outwardly in a lateral direction away from the camera body, it may swing on the pivot hinge 4, 21 without causing any canting of the attaching fixture obliquely away from the camera wall 31 in a manner which might cause damage either to the attaching fixture or to the pin 31. The stirrup 35 serving to retain the attaching fixture close to and approximately parallel to the camera wall 33 notwithstanding an outward pull on the strap in a lateral direction away from the camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body having a side wall and a stationary pin projecting laterally outwardly from said side wall near its top, of a carrying strap attaching fixture adapted to be secured to one end of a carrying strap, said attaching fixture being detachably secured to said stationary pin and comprising an elongated body member adapted to be fastened at one end to a strap and having an approximately centrally located longitudinal slot having a closed end and opening at the other end of said body, said slot having a width to receive the diameter of said pin snugly in the slot, a pair of latching dogs pivoted on said body respectively on opposite sides of said slot near said other end of said body, each of said dogs having an abutment portion extending from the pivot of the dog in a general direction toward the closed end of said slot and normally lying across a substantial part of the width of said slot in a position to obstruct movement of said pin from the closed end of said slot toward the open end thereof, spring means engaging both of said dogs and resiliently tending to move the abutment portions of both dogs respectively toward each other and keep them in obstructing relation to a pin tending to move along said slot, and a tail portion on each dog projecting beyond said other end of said body and so positioned that when the two tail portions of the two dogs are squeezed toward each other, said dogs will be swung on their respective pivots, against the force of said spring means, to move the abutment portions of the dogs out of alinement with said slot so that the pin at the closed end of said slot may move along said slot past the normal positions of said abutment portions and toward the open end of said slot.

2. A construction as defined in claim 1, further including a stirrup bar fastened to said side wall of said camera and extending across the outer end of the pin projecting from such side wall, said body member being inserted between said stirrup bar and the side wall of the camera in embracing relation to the pin, the tail portions of said dogs projecting below the bottom of said stirrup bar to a position accessible for squeezing toward each other when the attaching fixture is to be detached from the camera.

3. The combination of a photographic article having a supporting pin, and means for detachably securing a carrying strap to said article, said securing means including a strap plate adapted to be secured in fixed position on a carrying strap, a metal plate hinged to said strap plate for pivotal movement relative to said strap plate on an axis extending transverse to the length of the strap plate, a slot formed in said metal plate and having a closed inner end and an open outer end, said slot being of such width that said pin may be slidably embraced in said slot and move along the length thereof, at least one latching dog pivoted on said plate at a point in the vicinity of but offset laterally with respect to the open end of said slot, said dog having a latching nose extending from its pivot toward said closed end of the slot and a releasing tail extending substantially in the opposite direction from said pivot, and a spring tending to move said latching nose of said dog to a position extending across a substantial part of the width of said slot at a sufficient distance from the closed end of said slot so that said pin may lie between said closed end of said slot and said latching nose to be retained thereby against movement along the slot toward the open end thereof, said dog being so shaped that when said releasing tail is pressed toward the center line of said slot with sufficient force to overcome said spring, said latching nose will be withdrawn from said slot to release said pin for movement along said slot to the open end thereof.

4. A construction as defined in claim 3, further including means on said article for holding said metal plate, when in embracing relation to said pin, against substantial tilting relative to said pin in the direction of the axis of said pin.

5. The combination of a photographic article, a supporting pin secured thereto, and an attaching fixture for detachably connecting a strap to said pin, said fixture comprising two plates in fixed relation to each other and spaced from each other in parallel relation throughout a substantial area, a slot extending through both plates from a closed end to an open end at a common edge of both plates, said slot being adapted to receive and embrace said pin, two pivots extending through the space between the plates on opposite sides of said slot, two latching dogs lying partly in the space between said plates, one pivoted on each of said pivots, each dog being capable of swinging on its pivot from a latching position in which one end of the dog extends across part of the width of said slot near the closed end of the slot to an unlatching position in which said end of the dog is withdrawn into the space between the plates in non-obstructing relation to said slot, a rivet connecting said two plates to each other approximately in line with said slot but beyond the closed end thereof, and a spring coiled around said rivet and having two ends respectively engaging the two dogs and tending to swing both dogs from unlatching position to latching position.

6. A construction as defined in claim 5, in which each latching dog when in latching position extends across approximately half the width of said slot and in which the diameter of said supporting pin is substantially greater than half the width of said slot so that said pin will be retained in said slot by either one of said latching dogs in latching position and will not be released until both dogs are moved away from latching position.

7. Disengageable connecting means for connecting a flexible supporting member to a wall of an article to be supported, said connecting means comprising a stirrup member fixed to the wall to be supported, said stirrup member having a portion parallel to and spaced outwardly from said wall, a pin secured to said wall and extending approximately perpendicular thereto within said stirrup member, a connecting fixture plate adapted for insertion in the space between said stirrup member and said wall by movement in a direction endwise of said plate and parallel to said wall and perpendicular to said pin, said plate having a slot open at one end and extending approximately along the center line of said plate for receiving and embracing said pin when said fixture plate is thrust endwise into the space between said stirrup member and said wall, a pair of latching dogs pivotally mounted on said fixture plate on opposite sides of said slot, each of said dogs being movable between latching position extending across part of the width of said slot to prevent removal of said fixture plate from said pin and an unlatching position withdrawn from said slot, a second plate hingedly connected to said fixture plate for swinging movement relative thereto about a hinge axis extending approximately perpendicular to the length of said slot and approximately parallel to said side wall when said fixture plate is latched on said pin, and means for connecting said second plate to a flexible supporting member.

References Cited in the file of this patent

UNITED STATES PATENTS

| 68,161 | Boutell | Aug. 27, 1867 |
| 2,140,333 | Reiter | Dec. 13, 1938 |
| 2,481,106 | Gold | Sept. 6, 1949 |
| 2,622,496 | Owens | Dec. 23, 1952 |

FOREIGN PATENTS

| 193,695 | Great Britain | Mar. 1, 1923 |